June 10, 1952 W. P. DALRYMPLE 2,599,898
VALVE
Filed July 19, 1946

INVENTOR
WILLIAM P. DALRYMPLE
BY
Wallace and Cannon
ATTORNEYS

Patented June 10, 1952

2,599,898

UNITED STATES PATENT OFFICE 2,599,898

VALVE

William P. Dalrymple, Rochester, N. Y., assignor to American Brake Shoe Company, New York, N. Y., a corporation of Delaware Application July 19, 1946, Serial No. 684,728

3 Claims. (Cl. 251—119)

This invention relates to a valve and more particularly to a valve of the diaphragm or disk type designed to obtain a unidirectional flow of fluids in systems where the direction of pressure alternates or reverses periodically. Valves of this type are commonly used, for example, to control the flow of fluid in fluid compressors, fluid driven motors, and the like, a particular application being to the intake and outlet ports of air compressors.

Valves of the character mentioned above have in the past commonly comprised a valve seat member with which a thin disk or diaphragm cooperates to close the valve when pressure tends to force fluid in one direction, the disk being permitted to move freely away from the seat and thus open the valve when the pressure is effective to cause fluid flow in the other direction. Thus, such valves are used to insure that fluid will flow only in the direction desired regardless of changes in the direction of applied pressure.

In valves of the aforesaid character the diaphragm or disk which constitutes a closure therefor may be of the free floating type where the reversal of fluid flow alone is relied upon to close and to open the valve. More commonly, however, resort is had to a resilient means, for example a coiled or spiral spring, to hold the disk or diaphragm closed against the seat, the valve being opened against the force of such spring when pressure in the desired direction of flow rises to a sufficient extent.

Disks of the character mentioned above which are not equipped with a spring are not always satisfactory because they are not as positive or as rapid in closing as may be desired for certain types of operation. On the other hand, spring actuated valves, although more positive and rapid in operation, may be objectionable for certain uses because of the fact that the springs break and cause trouble in other parts of the associated mechanism, or the springs may cause undue wear or may stick or be otherwise unsuitable for a particular application.

An object, therefore, of my invention is to design a valve which will be more positive in operation than the free floating disk type mentioned above without requiring the use of a spring.

Another object is to make use of the force of magnetism to replace resilient means, such as springs and the like, for facilitating and insuring proper closure of valve disks in valves of the character aforesaid.

A further object is to assemble magnetic elements with a disk or diaphragm type of valve in such a manner as to provide a simple convenient assembly which is positive in operation and still composed of only a minimum number of moving parts.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
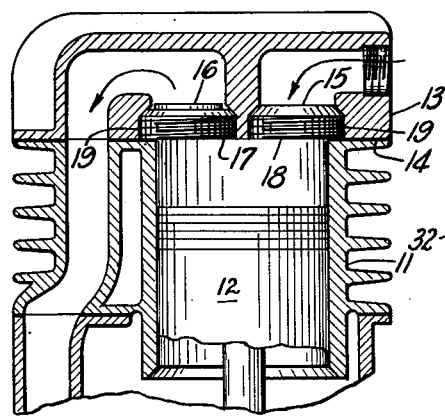
Fig. 1 is a vertical sectional view of a compressor cylinder and cylinder head incorporating valves of the type to which my invention pertains.
Figure 3:
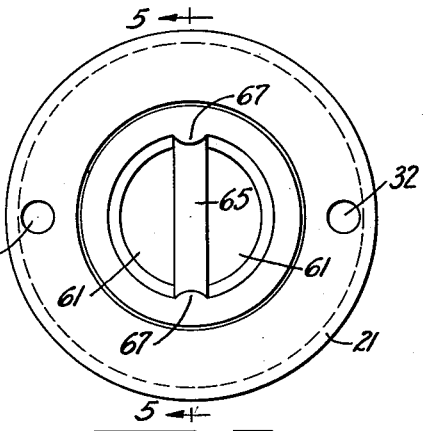
Fig. 3 is a view of a valve of the type shown in Fig. 2 taken from the rear or side opposite the closure disk.

As shown in the drawings, the valve which comprises my invention may be applied either as an inlet or an outlet valve in an air compressor of conventional design. It will be obvious that the valve might be applied to many different types of apparatus and the following description in connection with elements of an air compressor is merely illustrative and is not intended to limit the application of the invention. As shown in Fig. 1, a compressor cylinder 11 encloses a piston 12 and the upper end of the cylinder is closed by a cylinder head 13 which is assembled therewith in a manner well known in the art. A gasket 14 is preferably employed to obtain a tight seal between the cylinder and the cylinder head.

In the upper right corner of the cylinder an inlet valve designated 15 generally is shown and at the upper left corner, Fig. 1, an outlet valve 16 is shown. These valves are identical in construction, the position of certain parts in one valve being merely inverted with respect to the position of corresponding parts in the other so that they may perform their proper functions of controlling the inflow or outflow of fluid, such as air, into or out of the compressor cylinder.

Figure 2:
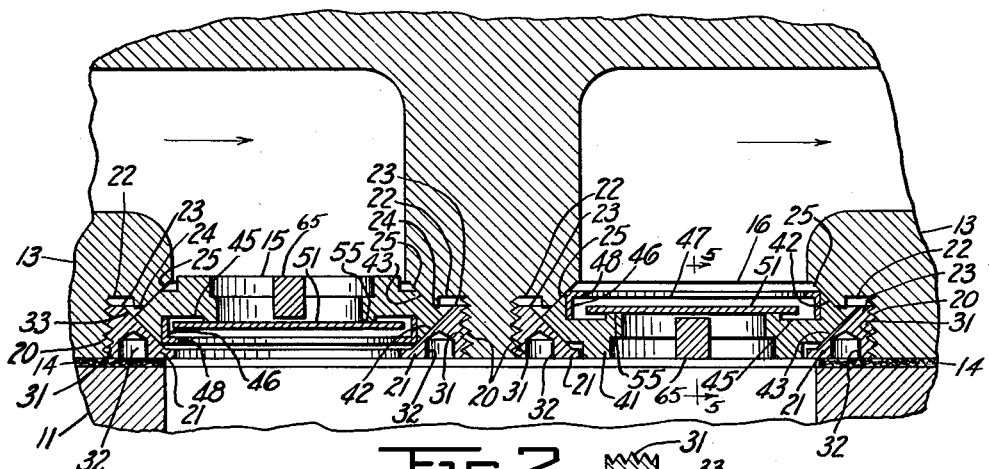
Fig. 2 is an enlarged vertical sectional view of part of the mechanism shown in Fig. 1 the valve being shown in section and this view being taken from another angle, the inlet port being on the left as seen in Fig. 2 and on the right as seen in Fig. 1.

Fig. 2 shows the same elements on a larger scale, the valves being shown in section and their positions being reversed so that the valve in the inlet position is at the left and the outlet valve is at the right as the parts are seen in this figure. The cylinder head 13 is provided with recesses 17 and 18 in which the valves referred to above may be received. Each of these recesses consists of a larger cylindrical portion 19 which is threaded as indicated at 20 to receive the retaining ring 21 of the valve structure which will be described in greater detail hereinbelow. In addition to the cylindrical portion each of the recesses in the cylinder head provides a shallow annular seat or recess 22 for the upper edge 23 of the ring 21, a shoulder portion 24 located just inside the seat or recess 22, and a conical seat element 25 which is adapted to cooperate with a correspondingly shaped part of the valve structure to be described below.

As shown at the left in Fig. 2, an inlet valve consists of the retainer 21 mentioned above and certain other parts which are held in position thereby. The retainer 21 is an annular ring having a threaded exterior surface, as indicated at 31, which is received into the threads 20 of a recess as 17 or 18 in the cylinder head. This retainer ring may have a pair of openings drilled or otherwise formed in its lower face, as indicated at 32, for receiving the ends of a spanner wrench by means of which the retainer may be screwed or unscrewed in the recess 17 or 18 of the cylinder head 13.

The annular ring which comprises the retainer 21 is beveled on its upper face, that is the face opposite that which is provided with the spanner openings 32, so as to form a conical surface 33 within which is seated the valve seat member 41. The seat member 41 is formed with both faces in the shape of a conical section so that either may be received and snugly fit within the conical recess of the retainer 21. Thus, as shown in Fig. 2, when the valve is used as an inlet valve, one face 42 of the valve seat member is received within the conical recess 33 and when it is used as an outlet valve the other conical surface 43 seats within the same recess. The valve may be assembled in either position, the retainer ring 21 occupying the same position where it is threaded into the recesses 17 or 18 of the cylinder head regardless of the position of the other valve parts.

Figure 4:
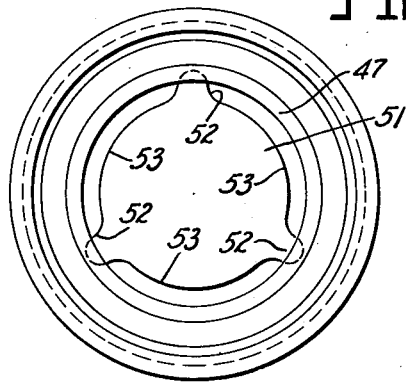
Fig. 4 is a face view of the valve shown in Figs. 2 and 3.

Referring now specifically to the outlet valve shown in the right hand portion of Fig. 2, it will be noted that the seat member 41 is provided with an annular recess 45 within its upper surface. A similar recess appears in the lower surface of the inlet valve seat. This recess serves to receive the downturned flange 46 of a valve plate or valve disk guide member 47. The member 47 has an inturned upper flange portion 48 which overlies the corners of the valve disk or diaphragm 51. As shown in Fig. 4, this disk or diaphragm 51 is preferably cut away at spaced points about its periphery so as to provide corner portions 52 separated by areas 53 through which fluid may flow when the valve is off the seat member 41.

As shown in Fig. 2, the outlet valve is mounted with the disk 51 resting upon an annular raised seating element 55 of the seat member 41. In this position, the valve is closed. It will be noted, however, that there is a space between the corner portions 52 of the diaphragm and the overhanging flange portion 47 of the valve plate guide. Hence, when pressure within the compressor increases the disk 51 may be raised off the seat and air or other fluid being compressed may flow upwardly through an opening 61 in the seat member 41 under the disk 51 and around its edges through the cut away portions 53, thence out through large annular opening in the valve plate guide 47. The overhanging flanges 48 of the valve plate guide prevent the disk 51 from being blown completely out of the valve assembly if fluid pressure is applied suddenly and forcibly thereto.

Figure 5:
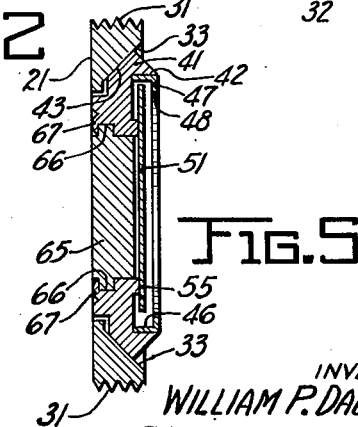
Fig. 5 is a sectional view of the valve structure taken substantially along the line 5—5 shown in Figs. 2 and 3.

Extended transversely of the opening 61 in the valve seat member 41 is a bar magnet 65. As best shown in Fig. 5, this bar magnet has a lug 66 formed on each end thereof and adapted to be retained within the seat member by means of an inturned tongue or indented portion 67 at each of its ends, such indented portions being formed by punching or upsetting the metal of which the valve seat 41 is formed. This magnet is preferably of fairly high flux density and of a good degree of permanence. The valve disk 51 is of magnetic material, preferably a good grade of steel and hence is attracted to the magnet except when sufficient force is applied to the undersurface of the valve disk to raise it from the seat. By this means it will be understood that the valve disk is normally retained on the seat by magnetic means which are simple in construction and effective and which offer no possibility of damage because of moving parts or broken fragments as may be the case when springs are employed.

It will be understood that the inlet valve shown at the left and the outlet valve shown at the right in Fig. 2 are of identical construction except for the manner of assembly of certain parts, the seat, diaphragm and valve plate guide being merely inverted, the valve retainer being in the same position in both valves as previously indicated. Thus in the case of the inlet valve, at the left in Fig. 2 or the right in Fig. 1, the magnet as 65 draws the plate or diaphragm 51 upwardly to close the valve. In the case of the outlet valve the diaphragm is drawn downwardly to closed position. The valve plate guide 47 is held in position by a part of the conical seat 33 within the valve retainer 21 in the case of the inlet valve 15. In the case of the outlet valve 16, the valve plate guide is retained in position by a part of the conical recess 25 in the cylinder head.

It will be understood that the flat disk or diaphragm 51 may be reversible, that is, either side thereof may be capable of seating in sealing relationship with the annular valve seat element 55. While the disk 51 is shown in Fig. 4 as having three projecting points or corner portions 52, it will be understood that any number of these might be provided and the disk might be of various shapes, for example, square or hexagonal so that corner portions would be retained by the overhanging flange 47 of the valve plate guide while air is permitted to flow around the disk through the intervening cut-away portions 53 when the valve is open.

From the foregoing, it will be apparent that the valve which comprises my invention, is simple and compact in design, has a minimum number of working parts, and is capable of giving long service without getting out of order.

Certain elements thereof might be changed without departing from the spirit of my invention. In particular, the valve disk 51 might be provided with an annular sealing element, equivalent to the seat element 55, and the valve seat member 41 be made smooth and plane to cooperate with such seat element. In this respect it is a matter of choice whether the raised element is on the seat or on the valve disk or diaphragm.

Hence, while I have illustrated and described the preferred embodiments of my invention, it is to be understood that these are capable of variation and modification and I, therefore, do not wish to be limited to the precise details set forth, but desire to avail myself of such changes and alterations as fall within the purview of the following claims:

I claim:

1. A valve comprising a valve seat member provided with an opening for the passage of fluid, a valve disc mounted in the seat member and adapted to close the opening to prevent the passage of fluid therethrough, a bar magnet extended across the opening and adapted to attract the valve disc to close the opening, a guide member mounted in the seat member and engageable with the disc for holding the disc in the seat member, and retainer means for holding the seat member, the disc, and the guide member in operative relation with respect to each other, the seat member, the disc, and the guide member being reversible as a unit with respect to the retainer means.

2. A valve comprising a seat member provided with an opening extending therethrough the seat member including a raised annular seat element surrounding said opening, a floating valve disc mounted in the opening and adapted to operatively engage the seat element to thereby close said opening and prevent the flow of fluid in one direction, a guide member mounted in the seat member and being disposed at one side of the valve disc, for retaining the valve disc in said opening, a bar magnet in said opening at the opposite side of the valve disc from the guide member and adapted to attract the valve disc into operative engagement with the seat element to thereby close the opening, and retainer means for holding all of said elements in assembled position within a valve chamber, the seat element having like surfaces on the opposite sides thereof so that the seat member, valve disc, and guide member are reversible as a unit, the retainer means having a surface portion formed complementary to the said like surfaces, either of the said like surfaces on a side of the seat element being engageable with a complementary surface of a valve chamber.

3. A valve of the type adapted to control the flow of fluid through a passageway in a compressor and the like, said valve comprising a seat member adapted to be mounted in such a passageway and being provided with an opening for the passage of fluid therethrough, said seat member having a raised annular seat element surrounding the opening, a floating valve disc mounted in the seat member and movable into operative engagement with the seat element to close the opening, the valve disc extending entirely across the seat element, a guide member adapted to be mounted in the seat member, the guide member and seat element being positioned on opposite sides of the valve disc to afford an enclosing structure for the valve disc, the enclosing structure being operable to limit movement of the valve disc in any direction, a bar magnet mounted on the seat member in position to attract the valve disc toward the seat element and over the opening, and a retaining member engageable with the side walls of the passageway and engageable with portions of the seat member to hold the seat member in the passageway.

WILLIAM P. DALRYMPLE.

REFERENCES CITED

The following references are of record in the file of this patent:

UNITED STATES PATENTS

| Number | Name | Date |
|---|---|---|
| 1,998,444 | Clapp | Apr. 23, 1935 |
| 2,216,809 | Derby | Oct. 8, 1940 |
| 2,339,087 | Mantz | Jan. 11, 1944 |
| 2,346,904 | Carlson | Apr. 18, 1944 |
| 2,430,427 | Katcher | Nov. 4, 1947 |

FOREIGN PATENTS

| Number | Country | Date |
|---|---|---|
| 212,570 | Germany | of 1909 |